June 1, 1954 — D. W. HAMM — 2,680,045

CIRCUMFERENTIAL EXPANDER PISTON RING

Filed June 11, 1953

INVENTOR
DOUGLAS W. HAMM
BY
Frank E. Liverance, Jr.
ATTORNEY

Patented June 1, 1954

2,680,045

UNITED STATES PATENT OFFICE 2,680,045

CIRCUMFERENTIAL EXPANDER PISTON RING

Douglas W. Hamm, Muskegon, Mich., assignor to Muskegon Piston Ring Company, Muskegon, Mich., a corporation of Michigan Application June 11, 1953, Serial No. 361,015

2 Claims. (Cl. 309—45)

This invention relates to and is concerned with a circumferential expander piston ring assembly, all parts being made of thin flat metal, and consisting of a circumferentially compressible inner ring member having vented openings for the passage of lubricant and short spaced outwardly extending tongues which extend outwardly between the inner edge portions of upper and lower parted steel rails of thin metallic material, together with a spacer between the outer portions of said rails to hold them in proper relation to each other and to the sides of the piston ring groove in which installed. Such rails are forced outwardly by the inner expander of circumferentially compressible type which, when installed, is reduced in circumference from which is generated therein the expander tension which manifests itself by a substantially even outward pressure against the inner edges of the rails.

Such structure of piston ring is fully vented for oil passage through it, excess oil on the inner walls of a cylinder in which the ring installed is salvaged by being scraped from the walls and passed through the ring structure of my invention to the bottom of the piston ring groove in which the ring is located and thence to the usual drainage passages from the bottom of the groove to the interior of the piston as well known in so-called, piston oil ring grooves.

The piston ring which I have devised and invented is particularly practical and useful, and is very effective for oil conserving purposes. The rails and the spacer may be cemented together if wanted so as to provide a single installation unit, the cement being dissolved and made ineffective when an engine in which the piston ring is installed is operated under the conditions of heat and temperature encountered. Also the piston ring may be installed in what is known as a bottomless piston ring groove, as well as that which has a bottom, there being no necessity of using an expander which, at spaced apart distances around it, presses against the bottom of the piston ring groove. Thus the novel structure may be used in so-called bottomless piston ring grooves as well as the groove with bottoms.

An embodiment of my invention is disclosed in the accompanying drawing, in which, Fig. 1 is a transverse vertical section through the piston ring of my invention.

Like reference characters refer to like parts in the different figures of the drawing.

In the structure of the piston ring of my invention, an inner expander member is made from a predetermined length of thin flat ribbon metal stock as indicated at 1. This expander ring will be of a circular form, the two ends coming together and having a joint at the parting, later described.

Figure 2:
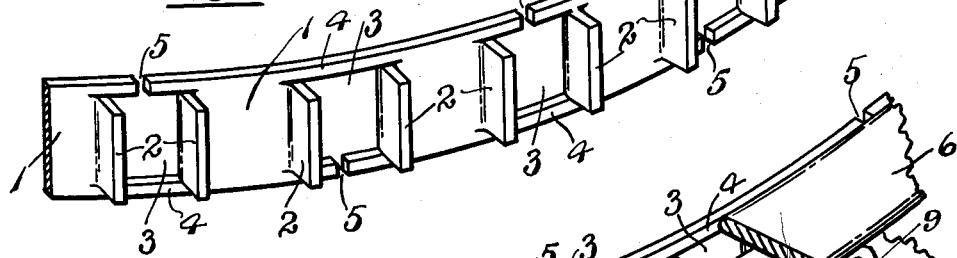
Fig. 2 is a fragmentary portion of a length of the circumferentially compressible expander element or member of the ring assembly and combination.

In the length of the member 1, in the form shown, a plurality of pairs of spaced tongues 2 of short dimension radially of the ring member are struck, each pair preferably being one at each vertical edge of an opening 3 which is left when such tongues are struck outwardly as shown in Fig. 2. It is of course to be understood that the outward extension of such short tongues may be obtained in various other ways by striking metal from the ribbon stock 1, and such tongues need not necessarily be arranged in pairs. The height of the tongues 2 is equal to the width of the ribbon stock 1 from which made less, at each upper and lower end thereof, substantially the thickness of a parted thin metallic rail, two of which are to be used. The alternate upper and lower boundaries of the openings 3 consist of the ties 4, one at each side of each opening 3 alternately at upper and lower edges of the expander ring member. Similarly, in successive openings, one after the other, such ties 4 which are continuous at one side of each opening 3 are cut across at the opposite side of the opening 3 to provide spaces or slots 5. Such slots 5, one at each opening 3, alternate in succession one at one side of an opening 3 followed by one at the opposite side of the next adjacent opening.

Thin metal parted rails 6, two in number, are used, one at its inner side portions passing over the upper ends of the tongues 2, resting thereagainst, and bearing at their inner curved edges against the several continuous ties 4 and the alternate transversely slotted ties. The second rail 6, of like form and material, is located below the lower sides of each of said tongues 2 and at its inner edges comes against the inner expander ring member, the upper and lower sides of the upper and lower rails 6 being approximately flush with the upper and lower edges of the expander ring member.

Figure 3:
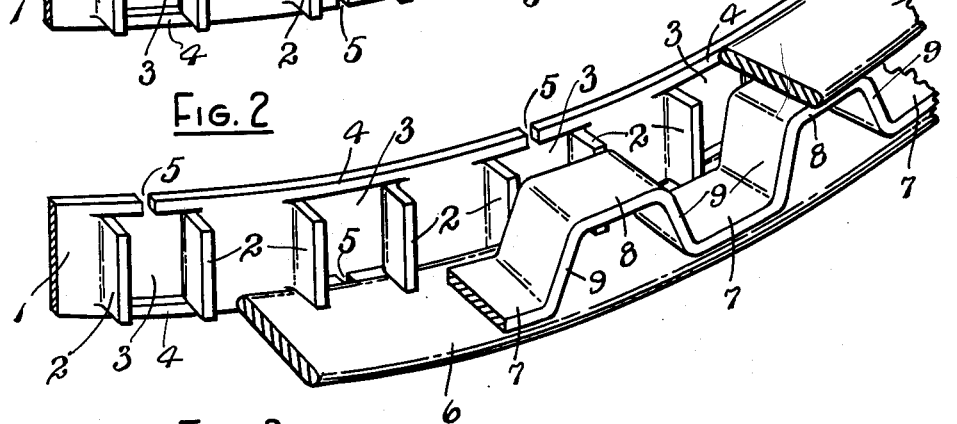
Fig. 3 is a similar perspective view showing the expander, rails and spacer in their assembled relation.
Figure 4:
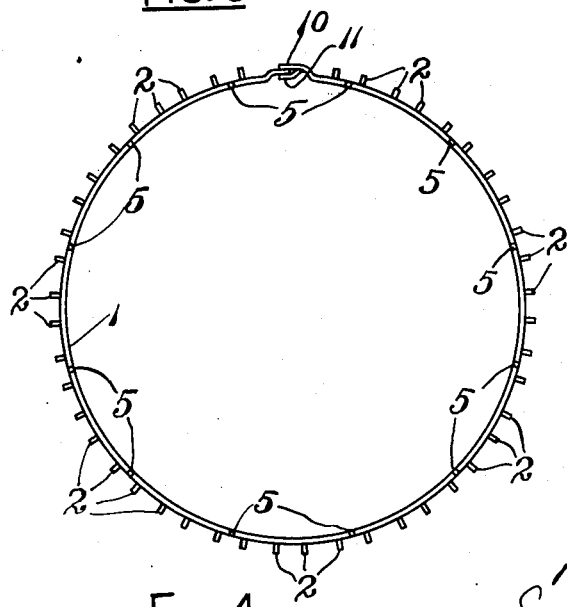
Fig. 4 is a plan view of the inner expander ring member of my invention.

Outwardly of the tongues 2 and between the upper and lower rails 6, a spacer made of a continuous flat length of metal in corrugated form is located. The corrugations are closed alternately at their upper and lower ends, providing flat lower sections 7 and upper flat sections 8 integrally connected by generally vertical legs 9 as shown in Fig. 3. The upper rail 6 at its outer portions rests against the flat sections 8 of the spacer, and the lower rail 6 bears against the under sides of the lower horizontal spacer section 7. The upper and lower surfaces of the alternate flat sections 7 and 8 lie in the same planes with the lower and upper ends of the tongues 2.

Figure 5:
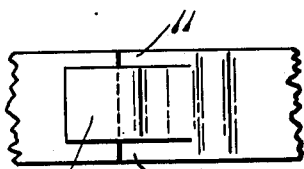
Fig. 5 is an enlarged elevation of a structure which may be used at the parting in such expander element.
Figure 6:
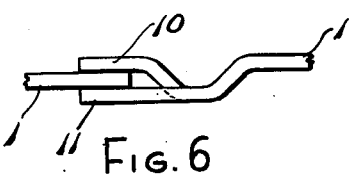
Fig. 6 is a plan view of such parting joint.

The inner circumferentially compressible ring member at its parting may have a joint of the character indicated in Fig. 5, wherein one end at the parting is received between spaced lips 10 and 11. The lip 10 is struck outwardly from the adjacent end portions of the other end of the ring member between the side edges thereof, leaving two spaced parallel lips 11. The spacing of the lips 10 and 11 is equal substantially to the thickness of the ribbon stock from which the expander ring is made. The joint described is one only of a number of joints which may be used but which hold the ends of the expander ring member securely against disconnection when the inner expander ring is circumferentially compressed and reduced in circumferential length.

In installing in a piston ring groove the inner circumferentially compressible expander ring member may be placed in a groove after which as a single installation unit the rails 6 and the spacer between them suitably cemented together at the contact areas of the parts 7 and 8 with their respective rails is inserted into the groove, the inner side portions of the rails 6 going above and below the tongues 2. Of course the invention is not limited to the utilizing of cemented together rails and spacer, as installation can be made though the rails and spacer are not cemented together.

Figure 1:
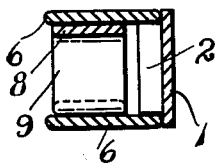

When thus assembled in a ring groove, the inner portions of the rails 6 are maintained separate from each other at an exact prescribed distance, while the outer portions of the rails are likewise held the same distance, as in Fig. 1. The contraction of the inner expander ring follows from the alternate upper and lower slots 5. With circular contraction a force is generated in the contracted ring member, the tendency of which is to restore the ring member to its full diameter, resulting in an outward radial pressure against the inner edges of the rails 6 to cause them to bear with an evenly distributed pressure against the walls of the cylinder in which installed.

The structure described is of a practical economical form. The rails are held from vibration, fluttering or the like, and are maintained against any tendency to work through an opening in a bottomless piston ring groove to the interior of the piston. The conventional corrugated metal ribbon expander is eliminated together with the necessity, as with such type of expanders, of bearing at spaced apart distances around the ring groove against the bottom thereof. Further, where the spacer member seats against the cylinder wall of an engine cylinder in which installed, there is provided a very even and uniform support for the spacer at its inner side.

The invention is defined in the appended claims and is to be considered comprehensive of all forms of structure coming within their scope.

I claim:

1. A circumferentially compressible, parted, generally circular band, having a series of short tongues struck radially outward therefrom, spaced from each other successively around the band, two spaced parted, thin rails outwardly of said band and located with their outer sides substantially flush with the edges of said band, said tongues extending between the rails at their inner portions, and a parted vertical spacer located outwardly from said tongues between the outer portions of the rails.

2. A circumferentially compressible, parted, generally circular metallic band, having a series of short tongues struck radially outward therefrom, spaced from each other successively around the band, two spaced, parted, generally circular, thin metallic rails, wider than the radial distance that the said tongues project from the band, having their inner edges against the outer side of said band and with said tongues extending between the inner portions of said rails, and a parted spacer located outwardly of said tongues between the outer portions of said rails, said rails at their outer edges extending outwardly beyond said spacer.

No references cited.